United States Patent

Weber

[11] 3,954,286
[45] May 4, 1976

[54] QUICK RELEASE TRAILER COUPLING
[75] Inventor: Bernard R. Weber, Elm Grove, Wis.
[73] Assignee: Valley Tow-Rite, Lodi, Calif.
[22] Filed: Aug. 27, 1975
[21] Appl. No.: 608,131

[52] U.S. Cl. .............................................. 280/512
[51] Int. Cl.[2] .......................................... B60D 1/06
[58] Field of Search ............ 280/511, 512, 513, 507

[56] References Cited
UNITED STATES PATENTS

| | | | |
|---|---|---|---|
| 2,726,099 | 12/1955 | Nunn | 280/512 |
| 2,971,777 | 2/1961 | Weber | 280/512 |
| 2,982,567 | 5/1961 | Bolmes | 280/512 |

Primary Examiner—Robert R. Song
Attorney, Agent, or Firm—Townsend and Townsend

[57] ABSTRACT

Apparatus for locking a coupling socket member in engagement with a mating ball member is disclosed. A ball retainer member is located within the coupling socket member and is movable from a lowered release position to a raised locked position. The ball retainer member is in engagement with the ball member in its raised position to lock the ball member to the coupling socket member. A latch bolt has a lower portion engaged with the ball retainer member and an upper portion which projects upwardly through an aperture in the coupling socket member. The upper end of the latch bolt has a notch formed therein. A cam lever overlies the aperture in the coupling socket member and has a pivot end pivotably attached to the latch bolt and an opposite free end. When the cam lever is pivoted from its release position to its locking position, it raises the bolt to move the ball retainer member from its lower release position to its raised locking position. A locking latch is provided which has a pivot end pivotably attached to the free end of the handle and an opposite free end adapted to overlie the upper end of the bolt. The locking latch has a preselected length so that upon pivoting of the handle to its locking position, the free end of the locking latch is aligned with the notch in the upper end of the latch bolt. A spring biases the locking latch toward the notch so that the free end of the locking latch snaps into engagement with the notch to lock the cam lever in its locking position. The locking latch can be manually actuated against the spring to disengage the free end of the locking latch from the notch and allow the cam lever to pivot to its release position, unlocking the coupling socket member from the ball member.

3 Claims, 6 Drawing Figures

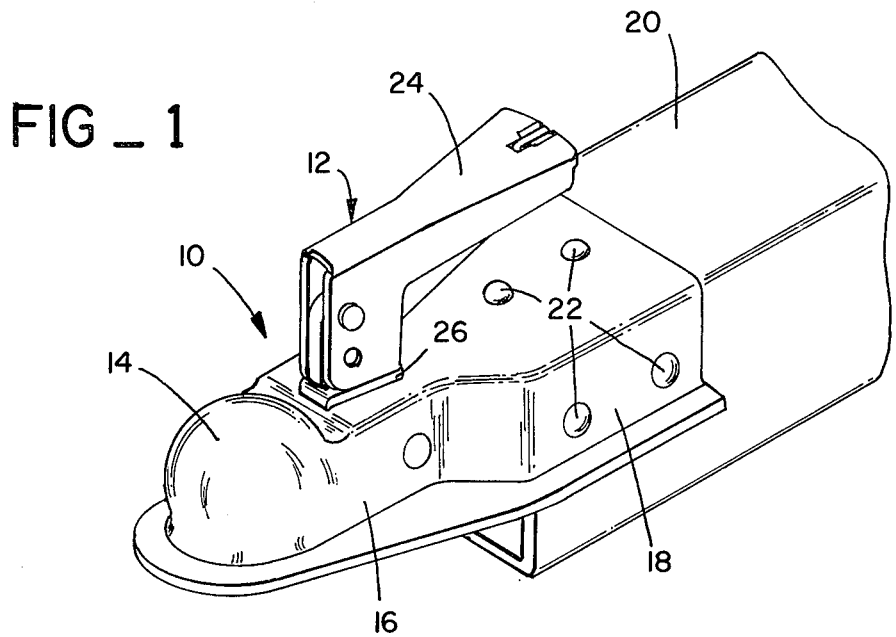
FIG _ 1
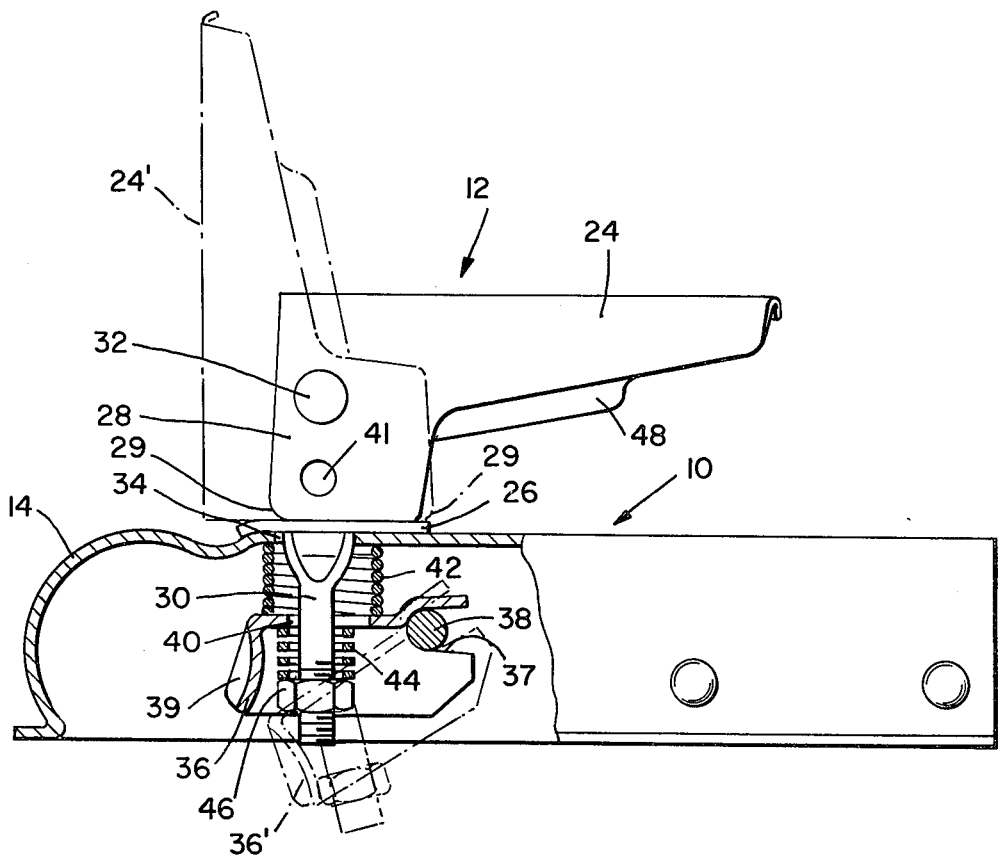
FIG _ 2

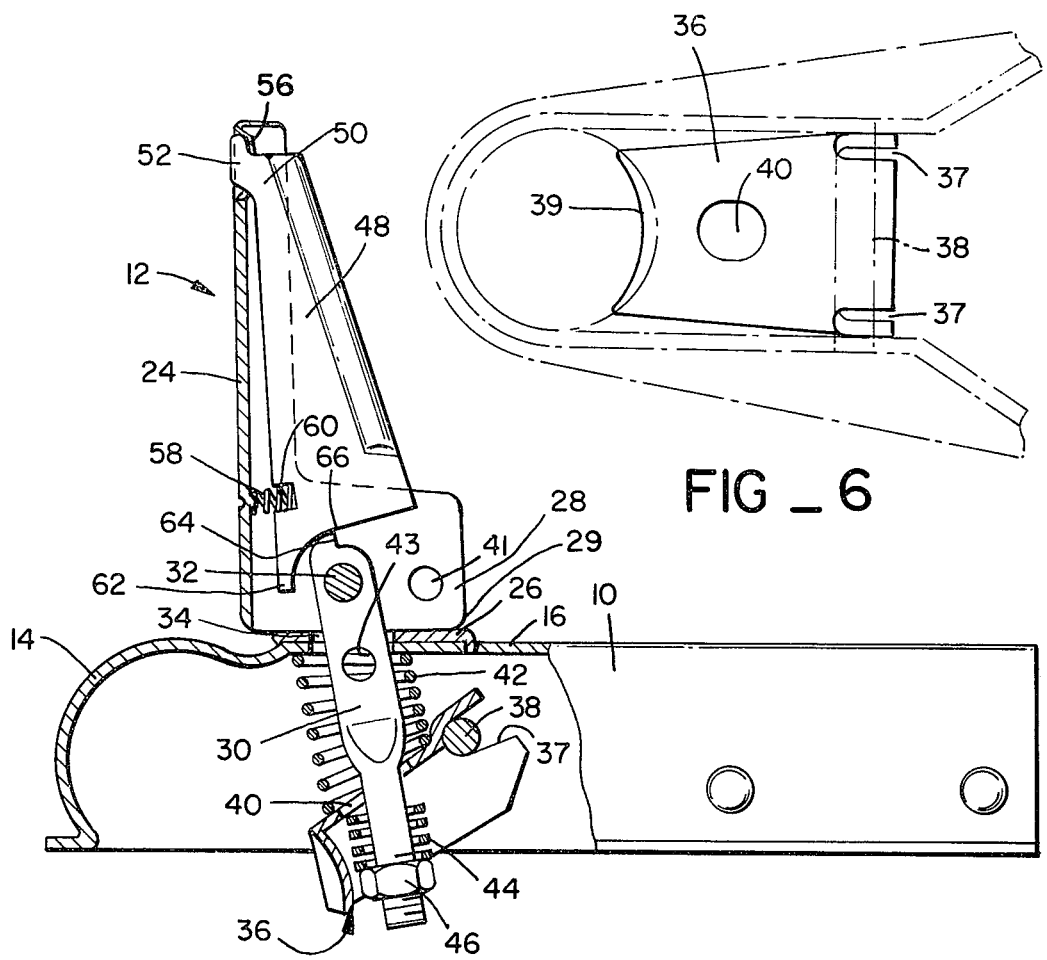
FIG_6
FIG_3
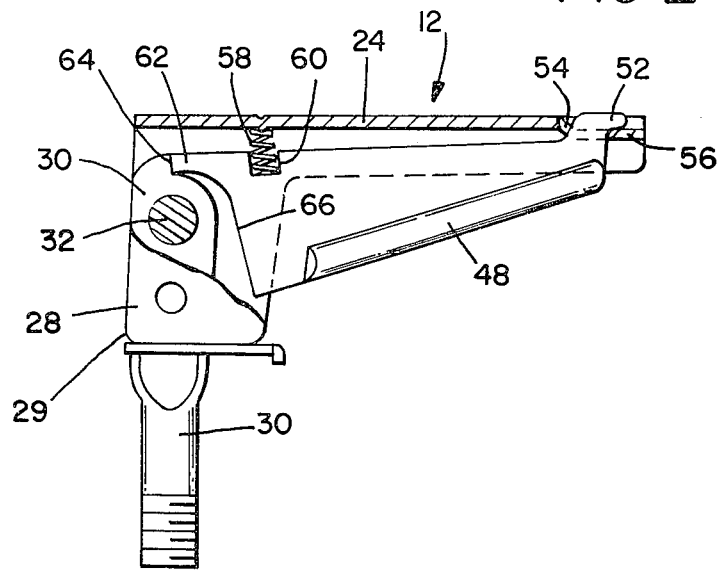
FIG_4
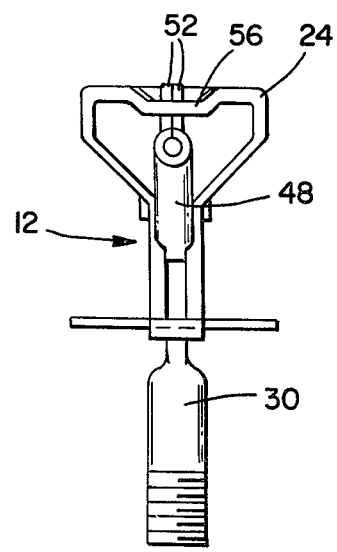
FIG_5

QUICK RELEASE TRAILER COUPLING

BACKGROUND OF THE INVENTION

When a coupling socket member is used to connect a trailer to a ball on a towing vehicle, it has been found desirable to lock the coupling socket member to the ball after they are engaged to insure that the trailer does not become disengaged from the towing vehicle. The locking devices which have been used for this purpose in the past ordinarily employ a pivotal ball retainer within the coupling socket member which pivots into engagement with the ball to lock the coupling socket member to the hitch ball. The ball retainer is controlled by a cam lever overlying the coupling socket member. The cam lever is connected to the ball retainer by a latch bolt which passes through the top of the coupling socket member. When the cam lever is pivoted so as to engage the ball with the ball retainer, the cam lever is locked in position to prevent the coupling socket member from becoming disengaged from the ball.

In certain of the locking devices discussed above, the lock includes a locking latch having a hook which engages the coupling socket member when the cam lever is moved to its locking position. The locking latch can be manually actuated to release the hook so that the cam lever can be pivoted back to its release position. In other such devices, the lock comprises a notch on the latch bolt, and a secondary lever which engages the notch when the cam lever is in the locking position. In these latter devices the secondary lever is actuated to release the lock.

In the devices described above which employ a locking latch that engages with the coupling socket member to lock the cam lever in position, the locking action is not as positive as desired. The hook can become disengaged from the coupling socket member, particularly when the towing vehicle operates on rough roads. In such circumstances the ball rattles against the ball retainer and the coupling socket member and the hook may come loose. Unlocking of the device in this situation is quite critical because on such rough terrain the chances of the coupling socket member becoming disengaged from the ball are substantial, and the tendency of such locking devices to release when they are most needed is quite undesirable. Devices of this type are usually provided with registering apertures in the cam lever and latch bolt through whcih a pin can be inserted to lock the cam lever in position, but the user often neglects to insert the pin or it is lost and the device can still become inadvertently disengaged.

The devices known in the art which employ a notch on the latch bolt and a secondary lever which engages the notch have been found to provide a relatively positive locking action. However, with such devices it is often quite difficult to disengage the secondary lever from the notch in the latch bolt so that the locking mechanism can be released. Such devices cannot be as conveniently unlocked as the trigger type devices can be, discouraging the use of such devices.

SUMMARY OF THE INVENTION

The present invention provides apparatus for locking a coupling socket member in engagement with a mating ball member. A ball retainer is located within the coupling socket member and is movable from a lowered release position to a raised locked position. The ball retainer is in engagement with the ball member in its raised position to lock the ball member to the coupling socket member. A latch bolt has a lower portion engaged with the ball retainer member and an upper portion which projects upwardly through an aperture in the coupling socket member. The upper end of the latch bolt has a notch formed therein. A cam lever overlies the aperture in the coupling socket member and has a pivot end pivotably attached to the latch bolt and an opposite free end. When the cam lever is pivoted from its release position to its locking position, it raises the bolt to move the ball retainer member from its lower release position to its raised locking position. A locking latch is provided which has a pivot end pivotably attached to the free end of the handle and an opposite free end adapted to overlie the upper end of the bolt. The locking latch has a preselected length so that upon pivoting of the handle to its locking position, the free end of the locking latch is aligned with the notch in the upper end of the latch bolt. A spring biases the locking latch toward the notch so that the free end of the locking latch snaps into engagement with the notch to lock the cam lever in its locking position. The locking latch can be manually actuated against the spring to disengage the free end of the locking latch from the notch and allow the handle to pivot to its release position, unlocking the coupling socket member from the ball member.

The principle advantage of the present invention is that it achieves the positive locking action of the secondary lever-type device with the convenience of the locking latch devices. The free end of the locking latch snaps into position to positively lock the coupling socket member to the ball. When the locking latch engages the notch, it makes a distinctive sound so that the user is certain that the device is locked in its locking position. Once engaged there is little likelihood of the device inadvertently disengaging. A pin or padlock can be used to insure that the device does not inadvertently disengage but is not necessary. Yet, when the device is to be released, the locking latch can be conveniently actuated and the cam lever moved to its release position so that the coupling socket member can be disconnected from the ball.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a coupling socket member mounted to the leading end of a trailer tongue and incorporating the locking device of the present invention;

FIG. 2 is an elevation view of the coupling socket member of FIG. 1 partially broken away with the locking device in the locking position;

FIG. 3 is a view similar to that of FIG. 2 with the device in the release position;

FIG. 4 is an elevation view of the locking latch mechanism of the present invention with the cam lever partially broken away;

FIG. 5 is a rear elevation view of the locking latch mechanism;

FIG. 6 is a plan view of the ball retainer member of the present invention with the coupling socket member in phantom.

DESCRIPTION OF THE PREFERRED EMBODIMENT

A coupling socket member 10 employing the locking device 12 of the present invention is illustrated by way of reference to FIG. 1. Coupling socket member 10 has a spherical concavity 14 adapted to mate with a corresponding hitch ball (see FIG. 6) on a towing vehicle. A downwardly opening neck 16 connects to concavity 14 and the body 18 of coupling socket member 10 is connected to the leading end 20 of a trailer tongue by bolts 22 or welding.

Referring to FIGS. 1 and 2 in the combination, locking device 12 has a cam lever 24 which rests upon the upper hardened surface of a carburized wear plate 26 overlying the neck portion 16 of coupling socket member 10. Cam lever 24 is pivotable about its pivot end 28 around a projecting radiused corner 29 from the locking position illustrated to its release position shown in phantom in FIGS. 2 at 24'. In both the locking and release position cam lever 24 is over center relative to corner 29 to fix the cam lever in each respective position.

Referring to FIGS. 2 and 3 in combination, a latch bolt 30 is pivotably attached to cam lever 24 by pin 32. Latch bolt 30 projects through an aperture 34 in the neck portion 16 of coupling socket member 10. A ball retainer member 36 is located within coupling socket member 10. As illustrated in FIG. 6, ball retainer member 36 has a pair of recesses 37 which engage a pin 38 fixed to the sides of coupling socket member 10 so that ball retainer member 36 is pivotable about a transverse axis.

Latch bolt 30 projects downwardly through an aperture 40 in ball retainer member 36. A first relatively flexible coil compression spring 42 circumscribes latch bolt 30 and is compressed between the upper surface of ball retainer member 36 and the underside of coupling socket member 10. Spring 42 is under compression and biases latch bolt 30 downwardly. A second relatively stiff flat helical spring 44 is located between a nut 46 threadably engaged with latch bolt 30 at its lower end and the underside of ball retainer member 36. Latch bolt 30 is thus engaged with ball retainer member 36 between the two springs 42, 44. The position of ball retainer member 36 relative to latch bolt 30 can be adjusted by moving nut 46 to compensate for wear in the socket 14, wear on the ball and dimensional tolerances of each as well as to adjust locking tension.

When cam lever 24 is in its locking position illustrated in FIG. 2, ball retainer member 36 is biased upwardly by stiff spring 44 so that the leading end 39 thereof engages and mates with a ball in concavity 14, locking the ball to coupling socket member 10. Spring 44 allows cam lever 24 to be pivoted to its over center locking position. Spring 44 is extremely stiff and holds ball retainer member 36 in engagement with the ball in the locking position of cam lever 24.

With cam lever 24 in the locked configuration, an aperture 41 in cam lever 24 registers with a corresponding aperture 43 (see FIG. 3) in latch bolt 30. A padlock (not shown) can be inserted through registering apertures 41, 43 to prevent unauthorized persons from decoupling the coupling socket member from the ball.

When cam lever 24 is moved from its locking position, illustrated in FIG. 2, to its release position illustrated in FIG. 3, it rotates about radiused corner 29 which is maintained in contact with the upper surface of wear plate 26. Since latch bolt 24 is over center with respect to corner 29 in its locking position, pin 32 will initially be raised slightly until the latch bolt has passed its over center position and then will move downwardly. During the initial upward movement of pin 32, bolt 30 will be correspondingly raised and helical spring 44 compressed until it nearly clashes. When pin 32 thereafter moves downwardly, latch bolt 30 will also move downwardly and helical spring 44 and compression spring 42 will expand. Compression spring 42 will pivot ball retainer member 36 downwardly about pin 38 and out of engagement with the hitch ball in concavity 14. The hitch ball is thus unlocked and the coupling socket member 10 can be disengaged from the ball.

As illustrated in FIGS. 3–5, a locking latch 48 is located partially within cam lever 24. Locking latch 48 has a pivot end 50 provided with a pair of prongs 52 which project through an aperture 54 in the free end of cam lever 24 and engage a depressed lip 56 at the end of the lever. Locking latch 48 is thus free to pivot about the free end of cam lever 24. A spring 58 engages a slot 60 on the upper surface of locking latch 48 and is compressed between the locking latch and cam lever 24 to bias the free end of locking latch 48 against latch bolt 30.

A notch 64 is formed in the upper end of latch bolt 30. The free end of locking latch 48 has a concavity 66. When cam lever 24 is in its release position illustrated in FIG. 3, concavity 66 at the free end of locking latch 48 overlies the notch 64 in the upper end of latch bolt 30. However, locking latch 48 has a preselected length so that when cam lever 24 is pivoted downwardly to its locking position illustrated in FIG. 4, the tip 62 of the locking latch is aligned with notch 64. Compression spring 58 biases locking latch 48 downwardly so that the tip 62 of the locking latch snaps into engagement with notch 64, emitting a distinctive click which indicates that cam lever 24 is in its locking position.

With the tip 62 of locking latch 48 engaged with notch 64 on latch bolt 30 as illustrated in FIG. 4, the locking latch prevents cam lever 24 from being pivoted back to its release position illustrated in FIG. 3. Engagement of the locking latch with the notch provides a positive locking action so that the device will not accidentally disengage. However, when it is desired to disengage locking device 12, the user simply grasps the cam lever 24 and squeezes so that locking latch 48 is pivoted upwardly against compression spring 58. The tip 62 of locking latch 48 is thus disengaged with notch 64, allowing the cam lever to be pivoted back to its release position. As described previously, when cam lever 24 is in its release position, the ball retainer member is pivoted downwardly out of engagement with the ball allowing the coupling socket member to be coupled and uncoupled with a towing vehicle.

In operation, when coupling socket member 10 is to be coupled with a ball on a towing vehicle, cam lever 24 is maintained in its upwardly pivoted release position. With cam lever 24 in its release position, ball retainer member 36 is pivoted downwardly and out of the way of the ball so that it can be mated with the complementary concavity 14 of the coupling member. After the ball has been inserted in concavity 14, cam lever 24 is pivoted downwardly to its locking position, pivoting ball retainer member 36 upwardly to lock the ball to the coupling socket member. When cam lever 24 reaches the locking position, the tip 62 of locking latch 48 snaps into engagement with the notch 64 on the upper end of latch bolt 30, emitting a distinctive click which indicates that locking device 12 is in its locking configuration. A padlock can be inserted through complementary apertures 41 and 43 in cam lever 24 and latch bolt 30 respectively to prevent theft of the trailer and further secure the device in its locking configuration.

When the trailer has reached its destination and is to be unhitched from the towing vehicle, cam lever 24 is grasped by the user and squeezed to pivot locking latch 48 upwardly. The tip 62 of locking latch 48 thus moves out of engagement with notch 64 at the upper end of latch bolt 30, allowing the cam lever to be pivoted to its release position. When cam lever 24 is moved to its release position, latch bolt 30 is moved downwardly to pivot ball retainer member 36 downwardly and out of engagement with the ball so that the coupling socket member can be uncoupled from the ball.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What I claim as new is:

1. Apparatus for locking a coupling socket member in engagement with a mating ball member, said apparatus comprising:
   a ball retainer member located at least partially within the coupling socket member, said ball retainer member being movable from a lowered release position to a raised locking position in engagement with the ball member to lock the ball member to the coupling socket member;
   a latch bolt having a lower portion engaged with the ball retainer member and an upper portion projecting upwardly through an aperture in the coupling socket member, the upper end of the latch bolt having a notch formed therein;
   a pivotal cam lever overlying the aperture in the coupling socket member and having a pivot end pivotably attached to the latch bolt and provided with a projecting cover and an opposite free end so that pivoting the cam lever in a first direction about the projecting cover moves the cam lever from a release position to an over center locking position and raises the latch bolt to move the ball retainer member from its lowered release position to its raised locking position, and pivoting the cam lever from its over center locking position to its release position lowers the latch bolt to move the ball retainer member from its locking position to its lowered release position;
   a locking latch having a pivot end pivotably attached to the free end of the cam lever and having an opposite free end adapted to overlie the upper end of the latch bolt, said locking latch having a preselected length so that upon pivoting the cam lever in the first direction to its over center locking position, the free end of said locking latch is aligned with the notch in the upper end of the latch bolt; and
   a spring bias means adapted to bias the locking latch toward the notch so that the free end of the locking latch snaps into engagement with the notch to lock the cam lever in its over center locking position, said locking latch being manually movable against the spring bias means to disengage the free end of the locking latch from the notch to allow the cam lever to pivot to its release position.

2. Apparatus as recited in claim 1 wherein the ball retainer member has a first end pivotably attached to the coupling socket member and a second opposite end adapted to engage the ball member.

3. Apparatus as recited in claim 1 and additionally comprising a first spring circumscribing the latch bolt between the ball retainer member and the coupling socket member adjacent the aperture in said coupling socket member to bias the ball retainer member downwardly, and a second spring circumscribing the latch between the lower end of the latch bolt and the ball retainer member so that the ball retainer member is engaged between said springs.

* * * * *